United States Patent
Song (10) Patent No.: US 8,213,786 B2
(45) Date of Patent: Jul. 3, 2012

(54) METHOD AND APPARATUS FOR PROCESSING DIGITAL IMAGE BY USING FAST AUTOFOCUS

(75) Inventor: Won-seok Song, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 12/976,990

(22) Filed: Dec. 22, 2010

(65) Prior Publication Data

US 2011/0150446 A1   Jun. 23, 2011

(30) Foreign Application Priority Data

Dec. 23, 2009  (KR) .................... 10-2009-0130029

(51) Int. Cl.
*G03B 13/36* (2006.01)
*G03B 35/08* (2006.01)

(52) U.S. Cl. .................... 396/121; 396/133; 396/325

(58) Field of Classification Search .................... 396/89, 396/121–123, 322, 325, 333; 348/46, 47, 348/345, 349–356
See application file for complete search history.

(56) References Cited

U.S. PATENT DOCUMENTS

| | | | | |
|---|---|---|---|---|
| 4,751,570 A | * | 6/1988 | Robinson | 348/47 |
| 7,663,688 B2 | * | 2/2010 | Wang | 348/345 |
| 7,676,146 B2 | * | 3/2010 | Border et al. | 396/80 |
| 7,889,985 B2 | * | 2/2011 | Misawa et al. | 396/122 |
| 8,059,186 B2 | * | 11/2011 | Nakahara | 348/345 |
| 2008/0219654 A1 | * | 9/2008 | Border et al. | 396/89 |

FOREIGN PATENT DOCUMENTS

| | | |
|---|---|---|
| JP | 2001-142166 A | 5/2001 |
| JP | 2001-281754 A | 10/2001 |

* cited by examiner

*Primary Examiner* — W. B. Perkey
(74) *Attorney, Agent, or Firm* — Drinker Biddle & Reath LLP (57) ABSTRACT

A method of performing fast autofocus (AF) in a digital image processing apparatus having a plurality of lenses mounted therein. By dynamically setting AF search start positions and AF search directions by using current AF position information, fast AF may be performed.

15 Claims, 9 Drawing Sheets

METHOD AND APPARATUS FOR PROCESSING DIGITAL IMAGE BY USING FAST AUTOFOCUS

CROSS-REFERENCE TO RELATED PATENT APPLICATION

This application claims the benefit of Korean Patent Application No. 10-2009-0130029, filed on Dec. 23, 2009, in the Korean Intellectual Property Office, the disclosure of which is incorporated herein in its entirety by reference.

BACKGROUND

The invention relates to a digital image processing apparatus having a plurality of lenses mounted therein, and more particularly, to a method of performing fast autofocus (AF) in a digital image processing apparatus having a plurality of lenses mounted therein.

According to the related art, when a digital image processing apparatus having two lenses mounted therein performs a photographing operation on an object, the two lenses separately perform autofocus (AF). In this case, the digital image processing apparatus is not used any differently from a digital image processing apparatus having only one lens for performing AF, and thus is inefficient.

Due to this inefficiency, an AF method has been proposed to drive the two lenses at different positions. However, in this case, since AF search start positions are fixed, the two lenses return to the fixed AF search start positions before AF may be performed again. Thus, it is inefficient when AF is repeatedly performed on the same object, or when an object is in focus when the two lenses are at a center position on a search range.

SUMMARY

Various embodiments of the invention provide a method of performing fast autofocus (AF) in a digital image processing apparatus having a plurality of lenses mounted therein.

According to an embodiment of the invention, there is provided a method of performing fast AF in a digital image processing apparatus having a plurality of lenses mounted therein, the method including the operations of detecting a current AF position by using the plurality of lenses, wherein the current AF position indicates a position corresponding to an AF peak value with respect to an object; detecting whether the current AF position is within an AF safety range; if the current AF position is within the AF safety range, setting an AF search start position of each of the plurality of lenses as the current AF position, and differently setting an AF search direction of each of the plurality of lenses; and if the current AF position is out of the AF safety range, differently setting the AF search start position of each of the plurality of lenses, and uniformly setting the AF search direction of each of the plurality of lenses.

The AF safety range may indicate a synchronization position of the plurality of lenses, which are minimally required to perform the AF. When at least one of the plurality of lenses finds a new focus position, others of the plurality of lenses may stop current searching operations and may move to the new focus position.

If the current AF position is out of the AF safety range, at least one of the plurality of lenses may set the AF search start position thereof as the current AF position, and at least another one of the plurality of lenses may set the AF search start position thereof at a center position in a search area.

According to another embodiment of the invention, there is provided a method of performing fast AF in a digital image processing apparatus having a plurality of lenses mounted therein, the method including the operations of storing dimensions of faces in an image when AF is performed; comparing the dimensions of the faces when face detection is performed; setting AF search directions of the plurality of lenses according to a change of the dimensions of the faces; and differently setting the AF search directions of the plurality of lenses.

When the change of the dimensions of the faces indicates a decrease, the AF search directions of the plurality of lenses may be set in a far direction, and when the change of the dimensions of the faces increases, the AF search directions of the plurality of lenses may be set in a near direction.

According to another embodiment of the invention, there is provided a digital image processing apparatus having a plurality of lenses mounted therein and supporting fast AF, the digital image processing apparatus including an AF position detection unit for detecting a current AF position; an AF safety range determination unit for determining whether the current AF position is within an AF safety range; an AF search position setting unit for setting an AF search start position of each of the plurality of lenses as the current AF position, if the current AF position is within the AF safety range, and differently setting the AF search start position of the each of the plurality of lenses, if the current AF position is out of the AF safety range; and an AF search direction setting unit for differently setting an AF search direction of the each of the plurality of lenses, if the current AF position is within the AF safety range, and uniformly setting the AF search direction of the each of the plurality of lenses, if the current AF position is out of the AF safety range.

When at least one of the plurality of lenses finds a new focus position, others of the plurality of lenses may stop current searching operations and may move to the new focus position. If the current AF position is out of the AF safety range, at least one of the plurality of lenses may set the AF search start position thereof as the current AF position, and at least another one of the plurality of lenses may set the AF search start position thereof at a center position in a search area.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Hereinafter, the invention will be described in detail by explaining exemplary embodiments of the invention with reference to the attached drawings.

Figure 1:
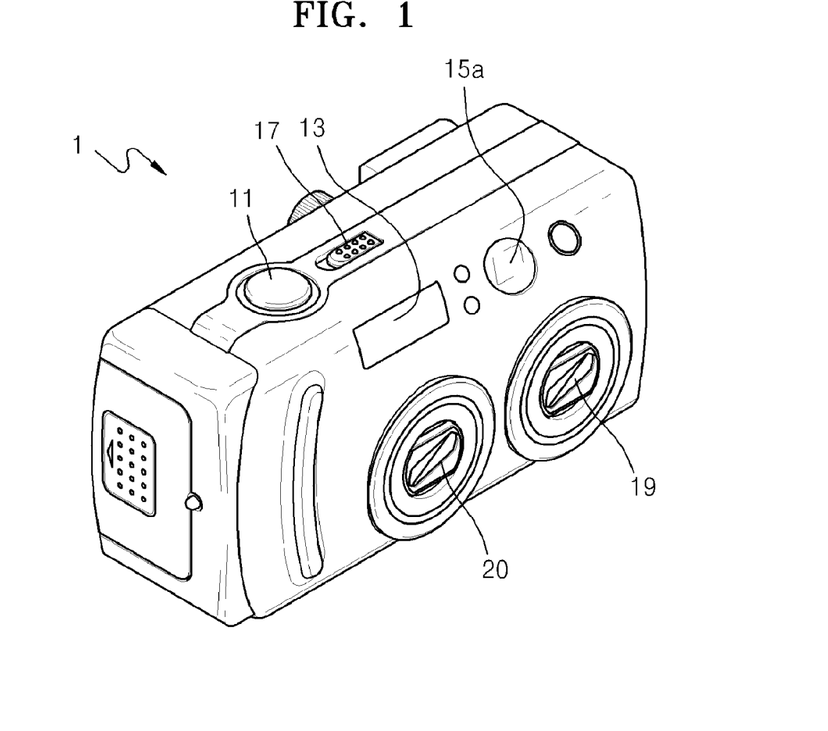
FIG. 1 is a perspective view for illustrating front and upper sides of a digital camera as a digital image processing apparatus according to an embodiment of the invention.

FIG. 1 is a perspective view for illustrating front and upper sides of a digital camera 1 as a digital image processing apparatus according to an embodiment of the invention.

Referring to FIG. 1, a shutter-release button 11, a flash 13, a viewfinder objective lens 15a, a power switch 17, a first photographing unit 19, and a second photographing unit 20 are arranged in the front and upper sides of the digital camera 1.

The shutter-release button 11 opens and closes a shutter to expose a charge coupled device (CCD), or for example, a film, to light from an object for a predetermined amount of time, while operating in conjunction with an aperture (not shown) to limit the light from the object exposed on the CCD, for the CCD to capture an image from the light.

The flash 13 functions to emit a flash of light when a photographing operation is performed in a dim place, and in this regard, flash modes include an auto-flash mode, a compulsory light emission mode, a no-flash mode, a red-eye reduction mode, a slow-synchronization mode, and the like.

The viewfinder objective lens 15a allows for framing a target object via a small window of the digital camera 1.

Figure 2:
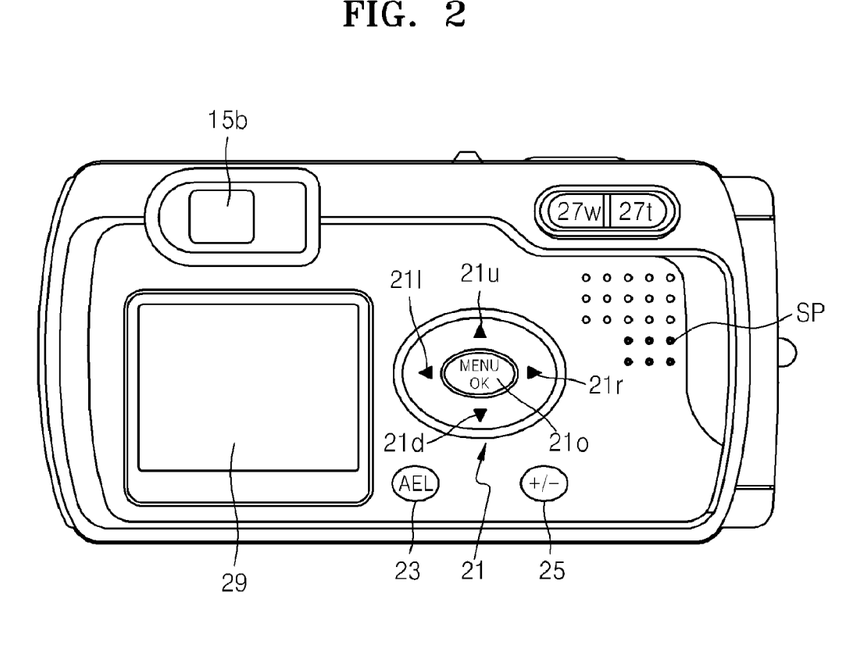
FIG. 2 is a rear view for illustrating a rear side of the digital camera of FIG. 1.

FIG. 2 is a rear view for illustrating a rear side of the digital camera 1 of FIG. 1.

Referring to FIG. 2, a viewfinder eyepiece unit 15b, function buttons 21 including an upward movement button 21u, a downward movement button 21d, a leftward movement button 21l, a rightward movement button 21r, and an okay (OK) button 21o, an Auto Exposure Lock (AEL) button 23, an Exposure Value Compensation (EVC) button 25, a wind-angle zoom button 27w, a telephoto-zoom button 27t, a color Liquid Crystal Display (LCD) panel 29, and a speaker (SP) are arranged in the rear side of the digital camera 1.

The function buttons 21 may be pressed to display various menus about operations of the digital camera 1. In particular, the function buttons 21 may be pressed to assign or select an exposed area to control an exposure amount therein, or to reassign or reselect the exposed area—detailed descriptions thereof will be described later.

The AEL button 23 may be pressed to lock an exposure amount on an image. When the AEL button 23 is pressed, the exposure amount is locked at an exposure value that is appropriate for an object, and an AEL icon is shown on a lower portion of the color LCD panel 29. The AEL button 23 may be manipulated after a half-pressed shutter state or a preview state, and then may be set to lock the exposure.

The EVC button 25 may be pressed to display menus related to image quality. That is, the EVC button 25 may adjust an exposure amount within a setting range of −2.0 EV through +2.0 EV, may adjust light sensitivity of the CCD, e.g., according to an International Organization for Standardization (ISO) value, and may adjust a white balance.

The wind-angle zoom button 27w and the telephoto-zoom button 27t may be pressed to widen and narrow an angle of view, respectively, and in particular, the wind-angle zoom button 27w and the telephoto-zoom button 27t may be pressed to modify dimensions of a selected exposed area. If the wind-angle zoom button 27w is pressed, the dimensions of the selected exposed area may become larger and the view may become wider, and if the telephoto-zoom button 27t is pressed, the dimensions of the selected exposed area may become smaller, and the view may become narrower.

Figure 3A:
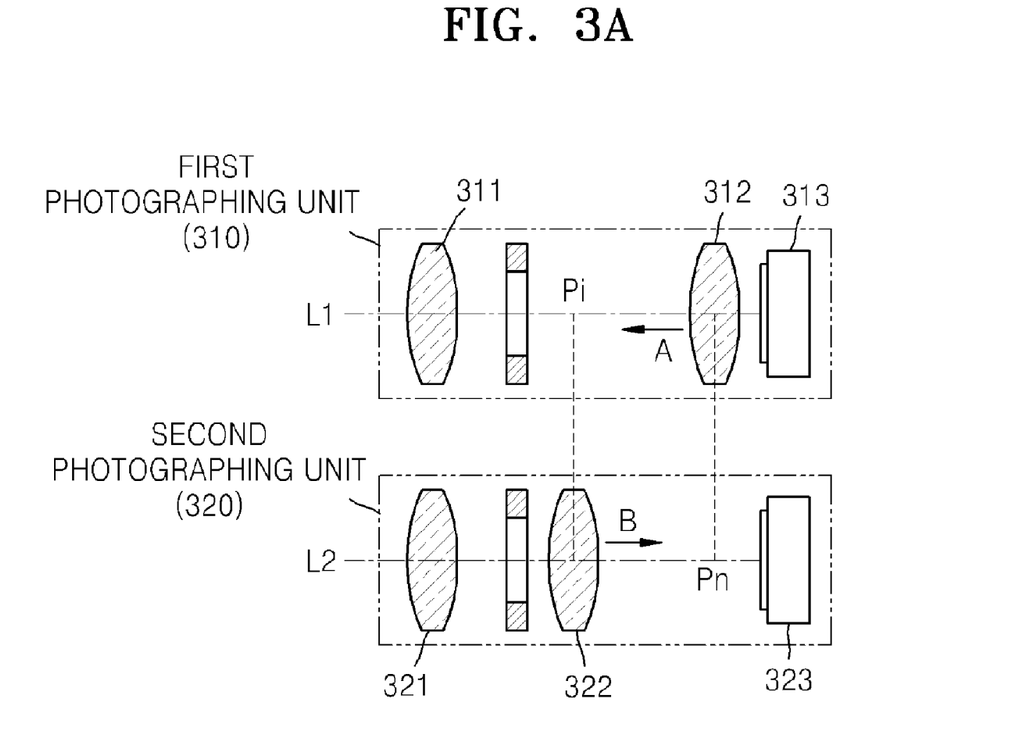
FIG. 3A is a pictorial cross section view illustrating an exemplary lens assembly and operation for performing autofocus (AF) in a digital image processing apparatus.
Figure 3B:
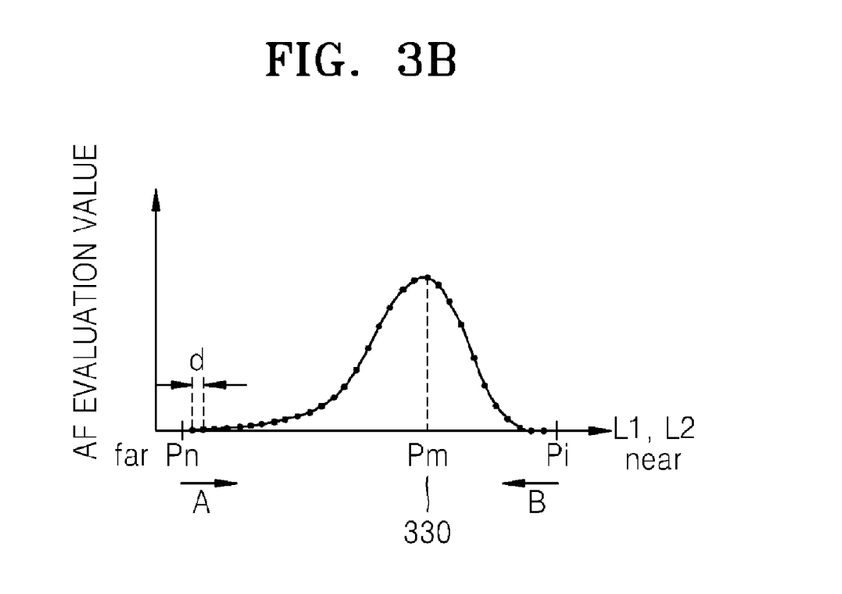
FIG. 3B is a graph illustrating the autofocusing in the example for performing autofocus (AF) in a digital image processing apparatus shown in FIG. 3A.

FIGS. 3A and 3B are diagrams of an example for performing AF in a digital image processing apparatus.

A first photographing unit 310 includes a first zoom lens 311, a first focus lens 312, and a first image sensor 313. A second photographing unit 320 includes a second zoom lens 321, a second focus lens 322, and a second image sensor 323.

In FIG. 3A, a near direction represents the leftward direction from the first and second image sensors (313, 323) along horizontal optical axes L1 or L2 (in a direction A), and a far direction represents the rightward direction along the horizontal optical axes L1 or L2.

The first photographing unit 310 performs a searching operation toward the near direction (in a direction A) along the optical axis L1 (in a direction B). The second photographing unit 320 performs a searching operation toward the far direction (in a direction B) along the optical axis L2.

The first focus lens 312 and the second focus lens 322 respectively move toward ends of a search range, that is, a farthest position and a nearest position, to perform the searching operations. Thus, as illustrated in FIG. 3B, when an object is in focus when the first focus lens 312 and the second focus lens 322 are at a center position (Pm, 330) on the search range, the first focus lens 312 and the second focus lens 322 each have to move to the center position (Pm, 330) on the search range whenever AF is performed.

In particular, when AF is performed again before the object has been photographed, the first focus lens 312 and the second focus lens 322 have to move back to the ends of the search range, that is, the farthest position and the nearest position, and then move again to the center position (Pm, 330) on the search range to perform AF. In this case, the repeated movements from the center position (Pm, 330) on the search range are inefficient.

Figure 4A:
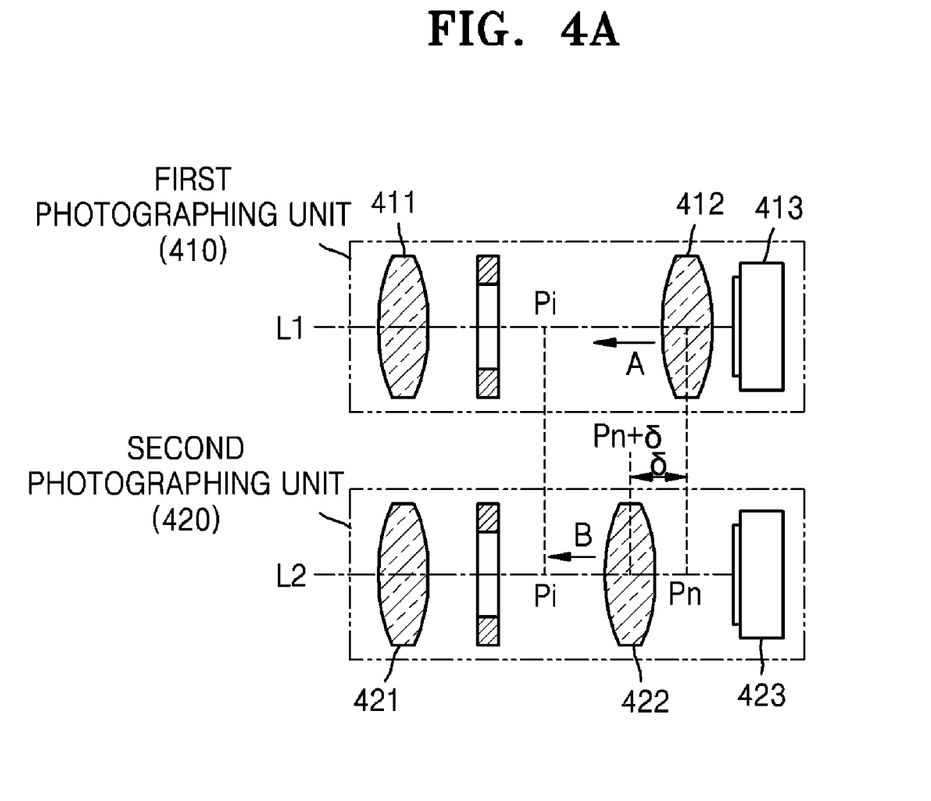
FIG. 4A is a pictorial cross section view illustrating an another exemplary lens assembly and operation for performing autofocus (AF) in a digital image processing apparatus.
Figure 4B:
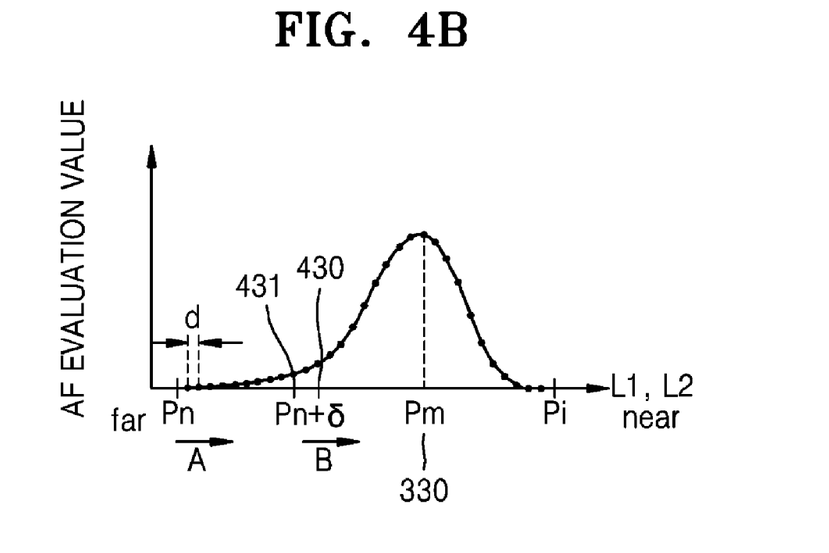
FIG. 4B is a graph illustrating the autofocusing in the example for performing autofocus (AF) in a digital image processing apparatus shown in FIG. 4A.

FIGS. 4A and 4B are diagrams of another example for performing AF in a digital image processing apparatus.

In FIG. 4A, a first photographing unit 410 performs a searching operation from a position Pn toward the near direction (in a direction A) on an optical axis L1. A second photographing unit 420 performs a searching operation from a position Pn+δ 430 toward the near direction (in a direction B) on an optical axis L2. That is, the first photographing unit 410 and the second photographing unit 420 perform the searching operations in the same direction and in a manner that the first photographing unit 410 and the second photographing unit 420 divide a search range, that reduces a search range.

If an object is in focus when a first focus lens 412 of the first photographing unit 410 and a second focus lens 422 of the second photographing unit 420 are positioned between the position Pn and the position Pn+δ 430 (e.g., at a position 431 in FIG. 4B), the second photographing unit 420 performing the searching operation in the direction B may not be able to perform AF, and the first photographing unit 410 performing the searching operation in the direction A may be able to perform AF when the first focus lens 412 the first photographing unit 410 reaches the center position 431. When AF is repeatedly performed, the second photographing unit 420 may repeatedly not be able to perform AF and the first photographing unit 410 has to be repeatedly driven from the position Pn to the center position 431. In this manner, when the object is in focus when the first focus lens 412 and the second focus lens 422 are positioned at a center position of the search range, the digital image processing apparatus may not obtain any significant effect by having two lenses, compared to a case in which only one lens is used. Hereinafter, an efficient AF method that may be performed by a digital image processing apparatus using a plurality of lenses will now be described.

Figure 5:
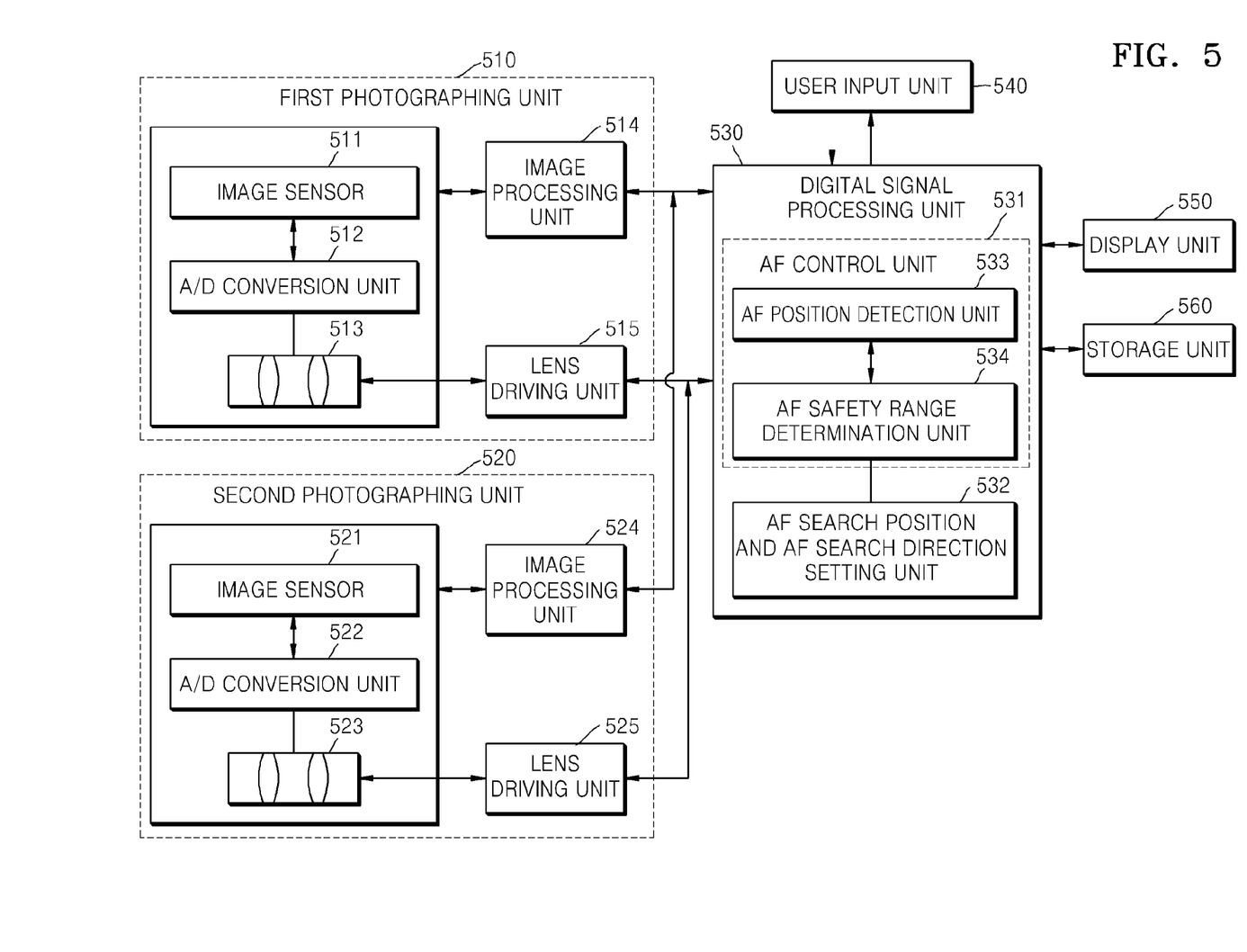
FIG. 5 is a block diagram of a configuration of a digital image processing apparatus according to an embodiment of the invention.

FIG. 5 is a block diagram of a configuration of a digital image processing apparatus according to an embodiment of the invention. Obviously, one or more embodiments of the invention are not limited to the digital image processing apparatus of FIG. 5, and thus may be applied to an image processing apparatus such as a personal digital assistant (PDA), a personal multimedia player (PMP), or the like. This is the same for modified embodiments to be described later.

The digital image processing apparatus according to the present embodiment of FIG. 5 includes a first photographing unit 510, a second photographing unit 520, a digital signal processing unit 530, a user input unit 540, a display unit 550, and a storage unit 560. In the present embodiment, two lens barrels are used to obtain a three-dimensional (3D) image, but three or more lens barrels may be used instead.

The first photographing unit 510 includes an image sensor 511, an analogue to digital (A/D) conversion unit 512, a lens unit 513, an image processing unit 514, and a lens driving unit 515. In addition, the first photographing unit 510 further includes a shutter and an aperture (not shown).

The A/D conversion unit 512 converts an analogue image signal output from the image sensor 511 into a digital image signal.

The lens unit 513 includes a zoom lens for controlling an angle of view to be narrowed or widened by adjusting a focal length, and a focus lens for adjusting a focus on a target object. Each of the zoom lens and the focus lens may be a single lens, or may be a group of lenses.

The zoom lens and the focus lens are arranged along an optical axis extending from a center of a light-receiving surface of the image sensor 511. The focus lens may move off the optical axis, and may change a focus position of an image formed on the light-receiving surface of the image sensor 511.

The image processing unit 514 digitally converts raw data in such a way that the data may be displayed. The image processing unit 514 compresses Y, U, and V signals from noise has been removed, and performs a signal processing operation on the Y, U, and V signals to generate a Joint Photographic Experts Group (JPEG) file. The generated JPEG file may be displayed on the display unit 550 and then stored in the storage unit 560.

The lens driving unit 515 drives the zoom lens and the focus lens according to a control signal that is input from the digital signal processing unit 530.

The second photographing unit 520 includes an image sensor 521, an A/D conversion unit 522, a lens unit 523, an image processing unit 524, and a lens driving unit 525. In addition, the second photographing unit 520 further includes a shutter and an aperture (not shown).

The digital signal processing unit 530 controls operations of the digital image processing apparatus. The digital signal processing unit 530 calculates an AF value by using a plurality of pieces of detection data obtained by the lens driving units 515 and 525 of the first photographing unit 510 and the second photographing unit 520.

The digital signal processing unit 530 includes an AF control unit 531 and an AF search position and AF search direction setting unit 532.

The AF control unit 531 may include an AF position detection unit 533 and an AF safety range determination unit 534. The AF position detection unit 533 detects a current AF position. The AF safety range determination unit 534 determines whether the detected current AF position is within an AF safety range.

When the current AF position is within the AF safety range, the AF search position and AF search direction setting unit 532 sets each of AF search start positions of a plurality of lenses at the current AF position, and when the current AF position is greater than the AF safety range, the AF search position and AF search direction setting unit 532 differently sets each of the AF search start positions of the plurality of lenses.

In the case where the current AF position is within the AF safety range, the AF position detection unit 533 differently sets an AF search direction of each of the plurality of lenses, and in the case where the current AF position is out of the AF safety range, the AF position detection unit 533 uniformly sets the AF search direction of each of the plurality of lenses.

In another embodiment, the AF control unit 531 may include a storage unit (not shown) and a comparing unit (not shown). In this case, the storage unit stores sizes of objects in an image when AF is performed, and then the comparing unit compares the sizes of the objects stored in the storage unit when a face detection operation is performed. The dimensions of the objects may include dimensions of a face. As a result of the comparison performed by the comparing unit, if the dimensions of the objects decrease, the AF search position and AF search direction setting unit 532 uniformly sets the movement direction of the plurality of lenses. In this case, since the plurality of lenses perform a searching operation in the same direction, the AF search position and AF search direction setting unit 532 may differently set each of the AF search start positions of the plurality of lenses, thereby increasing an efficiency of the searching operation. This will be explained further with reference to FIG. 10.

The digital signal processing unit 530 may reduce noise in input image data, and may perform any of image signal processing operations including gamma correction, color filter array interpolation, color matrix, color correction, color enhancement, and the like, on the input image data. Also, the digital signal processing unit 530 may generate an image file by compressing image data that is generated from the image signal processing operations, or may restore image data from an image file. A compression type of an image may be reversible or irreversible. For example, the image may be converted into a JPEG type or a JPEG 2000 type.

The digital signal processing unit 530 may perform an unsharpening processing operation, a color processing operation, a blur processing operation, an edge emphasis processing operation, an image analysis processing operation, an image recognition processing operation, an image effect processing operation, and the like. The image recognition processing operation may include a scene recognition processing operation.

The digital signal processing unit 530 may perform the aforementioned image signal processing operations, and may control each configuring unit according to results of the image signal processing operations. Also, the digital signal processing unit 530 may control each configuring unit according to a user control signal input via the user input unit 540.

The user input unit 540 may include members via which a user may manipulate to set various setting for a photographing operation. For example, the user input unit 540 may be embodied as a button, a key, a touch panel, a touch screen, a dial, or the like, and may receive a user control signal that may relate to any of powering on/off, photographing start/stop, reproduction start/stop/search, driving of an optical system, mode change, menu manipulation, selection manipulation, and the like.

The storage unit 560 may be detachable or may be fixedly mounted in the digital image processing apparatus. The storage unit 560 may include a Synchronous Dynamic Random Access Memory (SDRAM), a flash memory, Secure Digital (SD)/Compact Flash (CF)/Smart Media (SM) cards, or the like.

Figure 6:
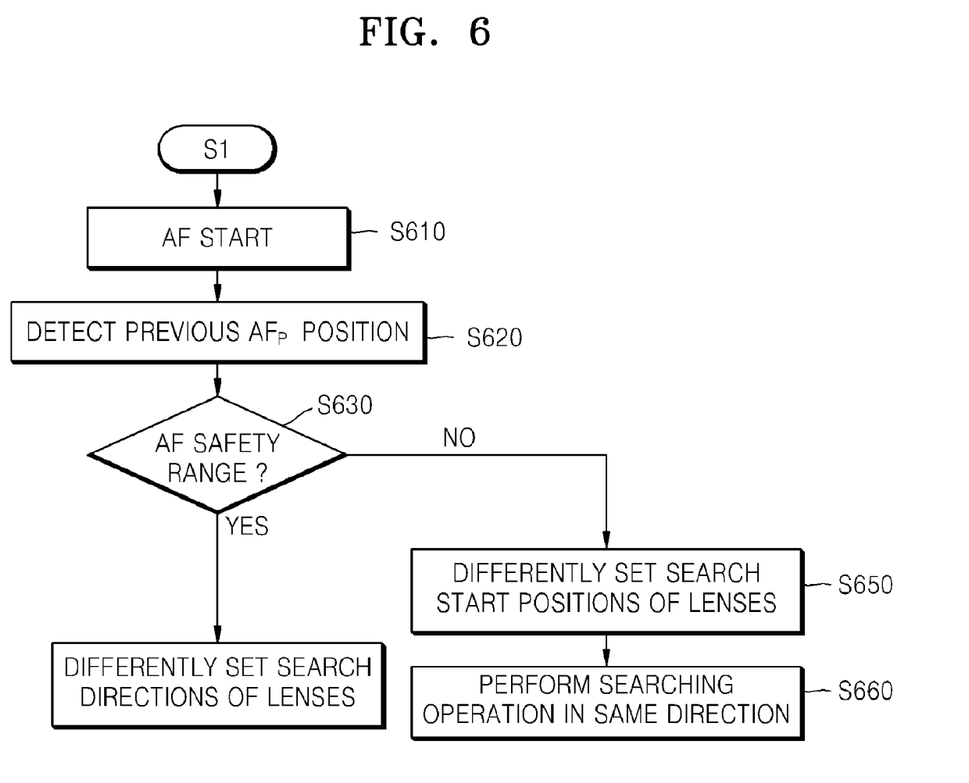
FIG. 6 is a flowchart of a method of performing fast AF when a plurality of lenses are used, according to an embodiment of the invention.

FIG. 6 is a flowchart of a method of performing fast AF when two or more lenses are used, according to an embodiment of the invention.

The AF search methods with reference to FIGS. 3 and 4 involve using fixed AF search positions, and thus are inefficient when AF is repeatedly performed. Accordingly, in the method according to the present embodiment, AF search start positions are dynamically set. In the method according to the present embodiment, current AF search start positions are set based on a previous focus position.

First, a shutter is half-pressed to perform AF (operation S610). A lens synchronization position AFp, the prior AF peak value, is detected (operation S620). If the lens synchronization position AFp is within an AF safety range, search directions of the plurality of lenses are differently set. The AF safety range represents a synchronization position of the plurality of lenses, which are minimally required to perform AF. A detailed description therefore will be described with reference to FIG. 7. In this case, an AF search start position of each of the plurality of lenses is set at the lens synchronization position AFp of the AF performed immediately prior (operations S630 and S640). A case in which the lens synchronization position AFp is within the AF safety range is described with reference to FIGS. 8A through 8D.

If the lens synchronization position AFp is out of the AF safety range, the search directions of the plurality of lenses are uniformly set. In this case, since the plurality of lenses each perform a searching operation in the same direction, AF search start positions of the plurality of lenses are differently set to be more efficient (operations S630, S650, and S660). A case in which the lens synchronization position AFp is out of the AF safety range is described with reference to FIGS. 9A through 9D.

Figure 7:
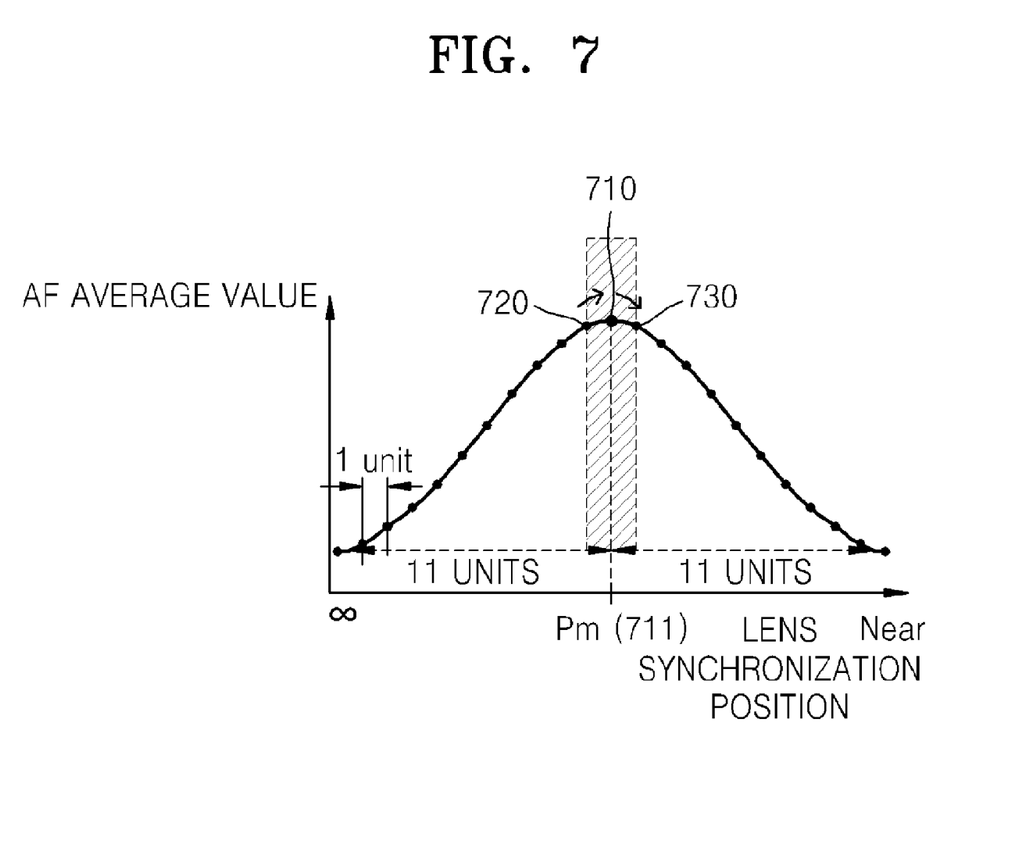
FIG. 7 is a graph illustrating a search area of a plurality of lenses for performing AF.

FIG. 7 is a diagram of a search area of a plurality of lenses for performing AF.

For convenience of description with reference to FIG. 7, a search area in which a lens may move is divided into 11 units left of a center position 610 and 11 units right of the center position 610. An X-axis of FIG. 7 indicates a synchronization position of a plurality of lenses, and a Y-axis indicates an AF evaluation value at each synchronization position obtained from the digital signal processing unit 530. When a synchronization position is closer to a reference position, it means that an object is positioned in a far distance range, and when a synchronization position is far from the reference position, it means that an object is positioned in a near distance range.

A lens synchronization position Pm 711 corresponds to a peak value 710 of an AF evaluation value curve formed by AF evaluation values of the synchronization positions and is obtained to perform autofocus. AF indicates searching for the peak value 710 of the AF evaluation value curve. Thus, in an ideal manner, AF evaluation values increase before and decrease after a peak position. Referring to FIG. 7, an increase is shown between a position 720 and the position 710, and a decrease is shown between the position 710 and a position 730. Thus, for AF, at least three positions are necessary, e.g., the AF evaluation values 710, 720, and 730.

When AF is performed, it is first checked whether focus lenses are within an AF safety range. The AF safety range represents a synchronization position of the plurality of lenses, which are minimally required to perform AF. In general, the AF safety range depends on a delay time unit α, that is a time taken to receive an AF evaluation value from the digital signal processing unit 530, and depends on a unit that is minimally requested to perform AF. In general, α indicates 1, and at least three units are necessary to detect an increase period and a decrease period to perform AF. Thus, in the present embodiment, when a current position of each focus lens is within four units in a search direction, it may be determined that each focus lens is within the AF safety range. However, the four units are an example, and thus the number of units may vary according to the definition of the AF safety range.

According to the present embodiment, AF search start positions may be dynamically set. When AF is initially performed, an AF searching operation is started at a predetermined position set in a digital photographing apparatus. After that, when AF is repeatedly performed, the AF search start position may be set based on a previous focus position.

According to the present embodiment, if a current focus position is within the AF safety range, new AF search positions are set at the current focus position search directions of the focus lenses are differently set, and then a searching operation is performed. This is referred to in FIGS. 8A through 8D.

However, if the current focus position is out of the AF safety range, the AF search start positions of the focus lenses are differently set whereas the search directions of the focus lenses are uniformly set.

A case in which the current focus position is out of the AF safety range may include a case in which the focus lenses are positioned at an end position corresponding to a far position, or a case in which the focus lenses are positioned at an end position corresponding to a near position, such that a minimum lens synchronization position is not guaranteed. Thus, when the current focus position is out of the AF safety range, the search directions of the focus lenses are uniformly set whereas AF search start positions of the focus lenses are differently set, so that the plurality of lenses may be efficiently used. This is illustrated in FIGS. 9A through 9D.

FIGS. 8A through 8D correspond to a case in which the current focus position is within the AF safety range.

Figure 8A:
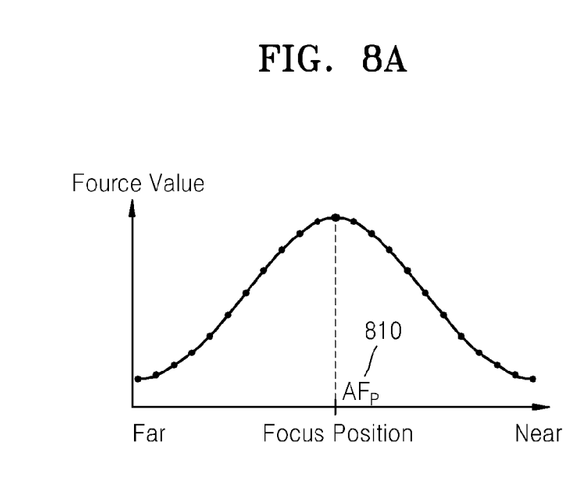
FIGS. 8A, 8C, and 8D are graphs that correspond to a case in which a current focus position is within an AF safety range.
Figure 8B:
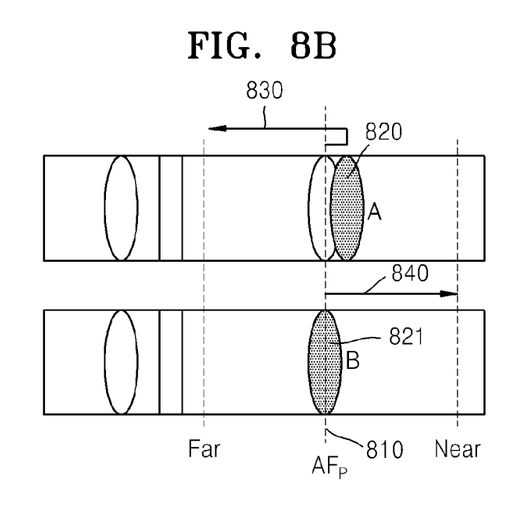
FIG. 8B is a pictorial cross section view of a lens arrangement and operation corresponding to the graphs of FIGS. 8A, 8C, and 8D.

Referring to FIG. 8A, an AF search start position indicates a current focus position AFp 810. First, it is determined whether the current focus position AFp 810 is within the AF safety range. Referring to FIG. 8A, the current focus position AFp 810 is within the AF safety range and thus a focus lens A 820 and a focus lens B 821 of FIG. 8B are driven in opposite directions 830 and 840, respectively. The search directions 830 and 840 are respectively shown in FIGS. 8C and 8D.

Figure 8C:
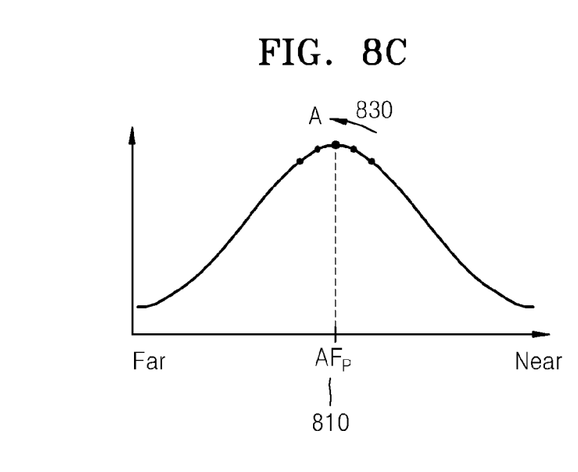
Figure 8D:
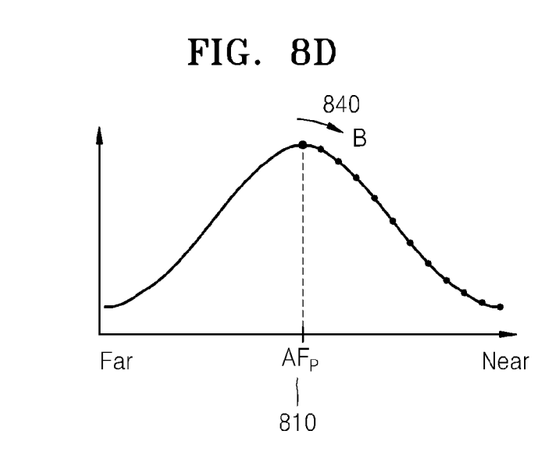

Here, referring to FIGS. 8B and 8C, in order to re-perform AF when the focus lenses are at the current focus position AFp 810, the focus lens A 820 moves in the same direction as the focus lens B 821 by ($\alpha$+1) units and then changes its direction to perform a searching operation in a far direction (in the direction 830).

The focus lens A 820 rapidly searches for a new focus position. When the focus lens A 820 finds the new focus position, the focus lens B 821 stops its current searching operation, and moves to the same position as the focus lens A 820 to adjust focus.

While the focus lens A 820 is centered in FIGS. 8A through 8B, the focus lens B 821 may move in the same direction as the focus lens A 820 by ($\alpha$+1) units and then change its direction, thereby performing a searching operation in a near direction. Also, if the focus lens B 821 finds the new focus first, the focus lens A 820 moves to the same position.

FIGS. 9A through 9D correspond to a case in which the current focus position is out of the AF safety range.

Figure 9A:
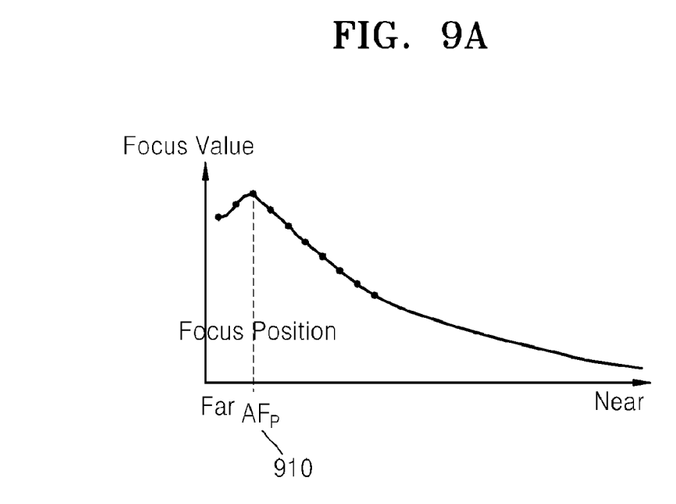
FIGS. 9A, 9C, and 9D are graphs that correspond to a case in which the current focus position is out of the AF safety range.

First, a current focus position AFp 910 is detected. Then, it is determined whether the current focus position AFp 910 is within the AF safety range. Referring to FIG. 9A, since the current focus position AFp 910 is out of the AF safety range, search start positions of a focus lens A 920 and a focus lens B 921 are differently set, and then the focus lenses A 920 and B 921 are driven in the same directions 930 and 940.

Figure 9B:
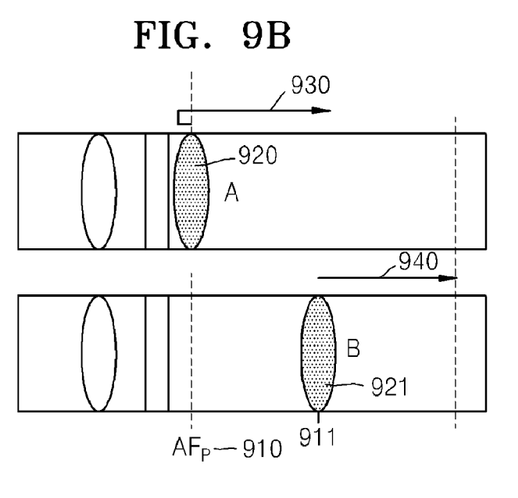
FIG. 9B is a pictorial cross section view of a lens arrangement and operation corresponding to the graphs of FIGS. 9A, 9C, and 9D.
Figure 9C:
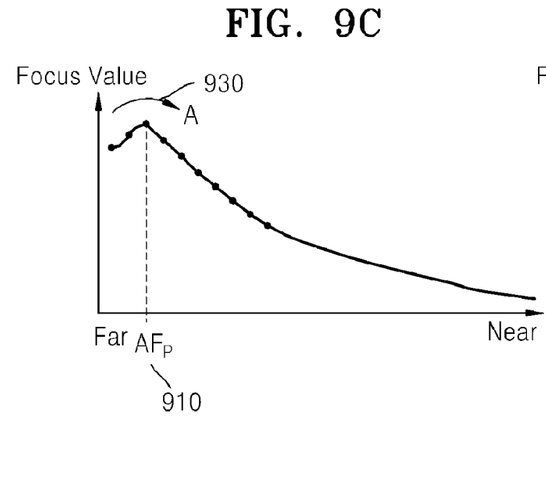
Figure 9D:
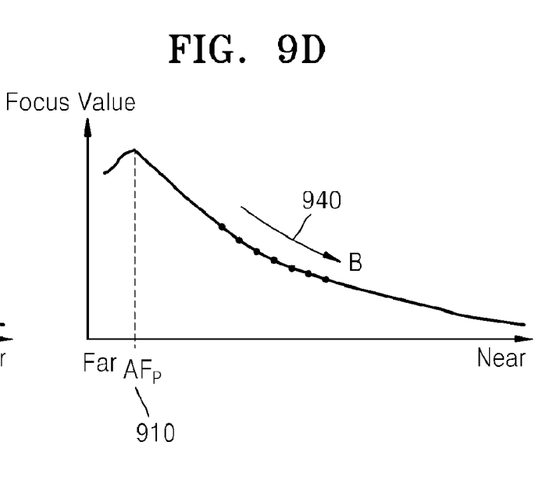

Referring to FIGS. 9B and 9C, in order to re-perform AF at the current focus position AFp 910, the focus lens A 920 moves in an opposite direction to the focus lens B 921 by ($\alpha$+1) units and then changes its direction to perform a searching operation in a far direction.

For example, a search start position of one of the focus lenses A 920 and B 921 is set at a center position in a search area. After that, the other one of the focus lenses A 920 and B 921 starts an AF searching operation at the current focus position AFp 910.

When the focus lens A 920 finds a new focus position, the focus lens B 921 stops its current searching operation, moves to the same position as the focus lens A 920, and then adjusts a focus position to adjust image focus, or vice versa with regard to lenses A and B.

Figure 10A:
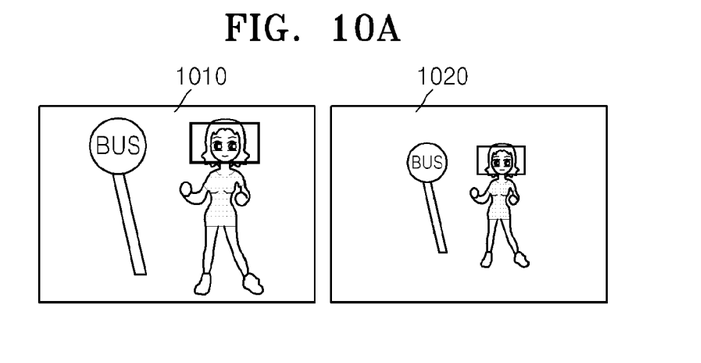
FIG. 10A is a pair of pictorial images illustrating a case in which fast AF is performed by a digital image processing apparatus having a plurality of lenses mounted therein when there is information about dimensions of faces.
Figure 10B:
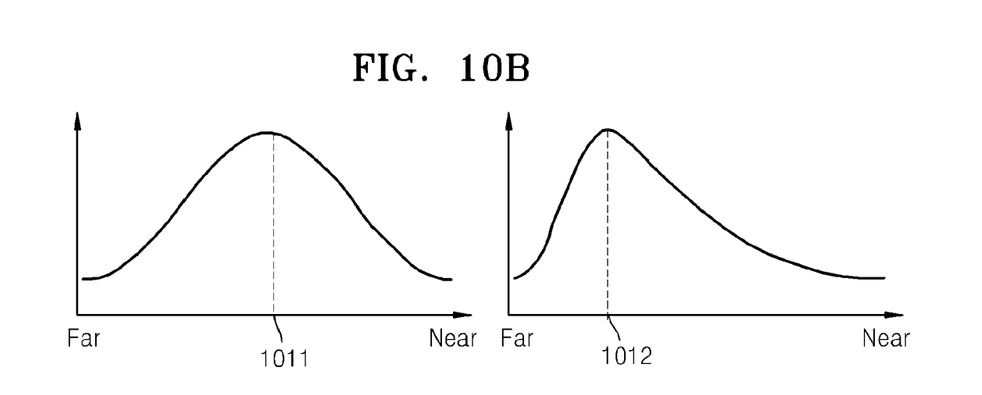
FIG. 10B is a pair of autofocus graphs illustrating each case shown in FIG. 10A in which fast AF is performed by a digital image processing apparatus having a plurality of lenses mounted therein when there is information about dimensions of faces.
Figure 10C:
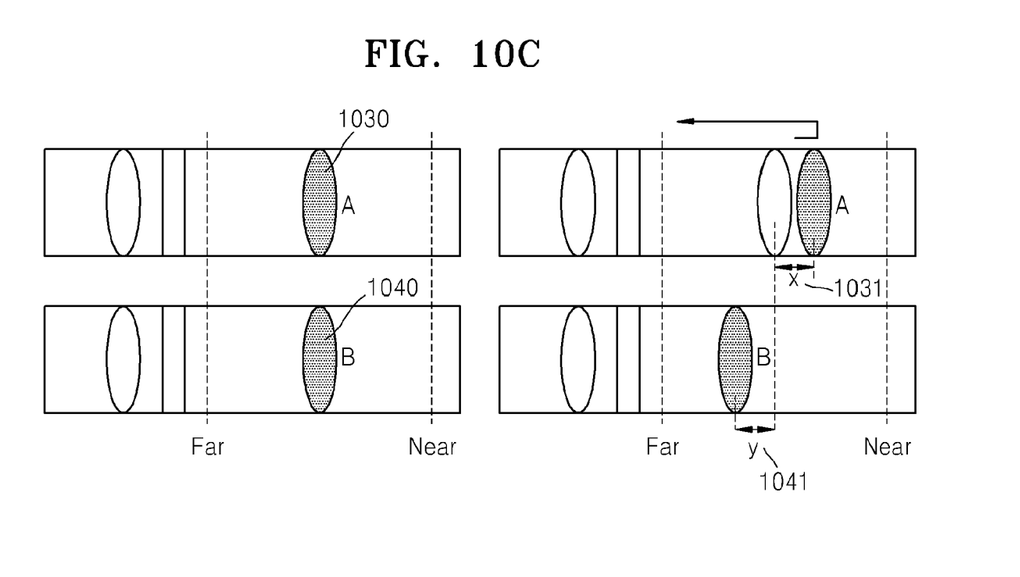
FIG. 10C comprises cross section view pictorial illustrations of a lens arrangement and operation corresponding to each case shown in FIGS. 10A and 10B.

FIGS. 10A through 10C correspond to a case in which fast AF is performed by a digital image processing apparatus having a plurality of lenses mounted therein, when there is information about dimensions of faces.

FIG. 10A illustrates two images 1010 and 1020 that are photographed at the same zoom level.

FIG. 10B are graphs of AF detection values of the images 1010 and 1020 of FIG. 10A. FIG. 10C illustrates paths on which lenses move to perform AF on the images 1010 and 1020 of FIG. 10A.

Referring to FIG. 10A, it is possible to see that objects in the image 1020 are relatively more distant from the digital image processing apparatus, compared to objects in the image 1010. Thus, the digital image processing apparatus may store dimensions of faces when the faces are in focus, and the digital image processing apparatus compares the dimensions of the faces whenever face detection (FD) is performed. Based on the comparison of the dimensions of the faces, the digital image processing apparatus determines an AF search direction. When the faces become smaller, the lenses move in a far direction, and when the faces become larger, the lenses move in a near direction. In this manner, if an FD value is known, it is possible to know the AF search directions and thus it is not necessary to move the lenses in different directions. In this case, since search directions are the same, search start positions of the lenses may be differently set. If one of the lenses finds a new focus position first, the other lenses stop its current searching operation, and moves to the new focus position to adjust focus.

With respect to the images 1010 and 1020 of FIG. 10A, it is possible to see that dimensions of objects become smaller between the image 1010 and the image 1020. Thus, as illustrated in FIG. 10B, travelling direction of the focus lens is moved in the far direction. Referring to FIG. 100, the focus lenses perform a searching operation in the same direction, that is, in the far direction.

In FIGS. 10C and 10D, a focus lens A 1030 moves in an opposite direction by an X unit 1031, and then returns its original direction to perform a searching operation. A focus lens B 1040 starts a searching operation at a position distant from the focus lens A 1030 by a Y unit 1041.

The X unit 1031 may be set to be greater than a ($\alpha$+1) unit to correct an error that may occur in detection of face dimensions. For example, it is possible to correct an error caused when face dimensions are various according to faces, or it is possible to correct an error of face dimensions that may vary although faces are in the same position. The Y unit 1041 may be set according to an angle of view, zoom, and detected distance information of the digital image processing apparatus. For example, a start position of the focus lens B 1040 may be at a center in a search area.

According to the one or more embodiments of the invention, the AF search start positions and the AF search directions of the plurality of lenses are set by using the current focus position. By doing so, inefficiency of the convention digital photographing apparatus using a fixed AF search start position may be reduced.

Also, by dynamically setting the AF search start positions and the AF search directions, when AF is repeatedly performed on the same object, a focus may be rapidly adjusted.

The one or more embodiments of the invention may include a processor, a memory for storing and executing program data, a permanent storage including a disk drive, a communication port for communication with an external device, and a user interface device including a touch panel, a key, a button, and the like. The methods embodied as a software module or an algorithm may be stored as computer readable codes or program commands that are executable on the processor in a computer readable recording medium. The computer readable recording medium is any non-volatile data storage device that can store data which can be thereafter read by a computer system. Examples of the computer readable recording medium include magnetic storage mediums (e.g., hard disks, etc) and optical reading mediums including CD-ROMs, DVDs, etc. The computer-readable recording medium can also be distributed over network-coupled computer systems so that the computer-readable code is stored and executed in a distributed fashion. The mediums can be read by computers, can be stored in the memory, and can be executed on the processor.

In the detailed description (in particular, in claims), the use of the term "the" and similar indicating terms may correspond to singular and plural forms. Also, when a range is described, the invention includes embodiments to which respective values in the range are applied (unless there is a particular description contrary thereto). Also, an order of operations performed by the methods according to the one or more embodiments may be changed unless there is a particular description about the order of operations. Thus, the one or more embodiments are not limited to the order of operations.

While the invention has been particularly shown and described with reference to exemplary embodiments thereof, it will be understood by those of ordinary skill in the art that various changes in form and details may be made therein without departing from the spirit and scope of the invention as defined by the following claims.

All references, including publications, patent applications, and patents, cited herein are hereby incorporated by reference to the same extent as if each reference were individually and specifically indicated as incorporated by reference and were set forth in its entirety herein.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

What is claimed is:

1. A method of performing fast autofocus (AF) in a digital image processing apparatus having a plurality of lenses mounted therein, the method comprising:
    detecting a current AF position by using the plurality of lenses, wherein the current AF position indicates a position corresponding to an AF peak value with respect to an object;
    detecting whether the current AF position is within an AF safety range;
    if the current AF position is within the AF safety range, setting an AF search start position of each of the plurality of lenses as the current AF position, and differently setting an AF search direction of each of the plurality of lenses; and
    if the current AF position is out of the AF safety range, differently setting the AF search start position of each of the plurality of lenses, and uniformly setting the AF search direction of each of the plurality of lenses.

2. The method of claim 1, wherein the AF safety range indicates a synchronization position of the plurality of lenses, which are minimally required to perform the AF.

3. The method of claim 1, wherein, if the current AF position is within the AF safety range, at least one of the plurality of lenses performs a searching operation in the same direction as others of the plurality of lenses for a predetermined period, changes direction, and then moves in the new direction.

4. The method of claim 3, wherein the predetermined period indicates a period distant from the current AF position by an $(\alpha+1)$ unit, and the $\alpha$ indicates a delay time taken to receive an AF evaluation value.

5. The method of claim 1, wherein, when at least one of the plurality of lenses finds a new focus position, others of the plurality of lenses stop current searching operations and move to the new focus position.

6. The method of claim 1, wherein, if the current AF position is out of the AF safety range, at least one of the plurality of lenses sets the AF search start position thereof as the current AF position, and at least another one of the plurality of lenses sets the AF search start position thereof at a center position in a search area.

7. A method of performing fast autofocus (AF) in a digital image processing apparatus having a plurality of lenses mounted therein, the method comprising:
    storing dimensions of faces in an image when AF is performed;
    comparing the dimensions of the faces when face detection is performed;
    setting AF search directions of the plurality of lenses according to a change of the dimensions of the faces; and
    differently setting the AF search directions of the plurality of lenses.

8. The method of claim 7, wherein, when the change of the dimensions of the faces indicates a decrease in dimensions, the AF search directions of the plurality of lenses are set in a far direction, and
    when the change of the dimensions of the faces increases, the AF search directions of the plurality of lenses are set in a near direction.

9. A digital image processing apparatus having a plurality of lenses mounted therein and supporting fast autofocus (AF), the digital image processing apparatus comprising:
    an AF position detection unit for detecting a current AF position;
    an AF safety range determination unit for determining whether the current AF position is within an AF safety range;
    an AF search position setting unit for setting an AF search start position of each of the plurality of lenses as the current AF position, if the current AF position is within the AF safety range, and differently setting the AF search start position of the each of the plurality of lenses, if the current AF position is out of the AF safety range; and
    an AF search direction setting unit for differently setting an AF search direction of the each of the plurality of lenses, if the current AF position is within the AF safety range, and uniformly setting the AF search direction of the each of the plurality of lenses, if the current AF position is out of the AF safety range.

10. The digital image processing apparatus of claim 9, wherein, when at least one of the plurality of lenses finds a new focus position, others of the plurality of lenses stop current searching operations and move to the new focus position.

11. The digital image processing apparatus of claim 9, wherein, if the current AF position is out of the AF safety range, at least one of the plurality of lenses sets the AF search start position thereof as the current AF position, and at least another one of the plurality of lenses sets the AF search start position thereof at a center position in a search area.

12. The digital image processing apparatus of claim 9, wherein, if the current AF position is within the AF safety range, at least one of the plurality of lenses performs a searching operation in the same direction as others of the plurality of lenses for a predetermined period, changes direction, and then moves in the new direction.

13. The digital image processing apparatus of claim 12, wherein the predetermined period indicates a period distant from the current AF position by an $(\alpha+1)$ unit, and the $\alpha$ indicates a delay time taken to receive an AF evaluation value.

14. A digital image processing apparatus having a plurality of lenses mounted therein and supporting fast autofocus (AF), the digital image processing apparatus comprising:
- a storage unit for storing dimensions of faces in an image when AF is performed;
- a comparing unit for comparing the dimensions of the faces when face detection is performed;
- an AF search position setting unit for setting AF search directions of the plurality of lenses, according to a change of the dimensions of the faces; and
- an AF search direction setting unit for differently setting the AF search directions of the plurality of lenses.

15. The digital image processing apparatus of claim 14, wherein the AF search direction setting unit sets the AF search directions of the plurality of lenses in a far direction when the change of the dimensions of the faces decreases, and sets the AF search directions of the plurality of lenses in a near direction when the change of the dimensions of the faces increases.

* * * * *